United States Patent
Benaddi et al.

(10) Patent No.: US 9,401,829 B2
(45) Date of Patent: Jul. 26, 2016

(54) METHOD FOR GENERATING A FILTER BANK FOR RECEIVING A SIGNAL MODULATED BY CONTINUOUS PHASE MODULATION, AND METHOD FOR RECEIVING SAID SIGNAL

(71) Applicants: THALES, Courbevoie (FR); CENTRE NATIONAL D'ETUDES SPATIALES, Paris (FR)

(72) Inventors: Tarik Benaddi, Toulouse (FR); Benjamin Gadat, Toulouse (FR); Charly Poulliat, Toulouse (FR); Marie-Laure Boucheret, Toulouse (FR)

(73) Assignee: Thales, Courbevoie (FR)

( * ) Notice: Subject to any disclaimer, the term of this patent is extended or adjusted under 35 U.S.C. 154(b) by 0 days.

(21) Appl. No.: 14/844,961

(22) Filed: Sep. 3, 2015

(65) Prior Publication Data
US 2016/0065393 A1   Mar. 3, 2016

(30) Foreign Application Priority Data
Sep. 3, 2014   (FR) ...................... 14 01953

(51) Int. Cl.
- *H04B 14/06* (2006.01)
- *H04L 25/03* (2006.01)
- *H04L 1/00* (2006.01)
- *H04L 27/22* (2006.01)

(52) U.S. Cl.
CPC ........ *H04L 25/03006* (2013.01); *H04L 1/0054* (2013.01); *H04L 25/03203* (2013.01); *H04L 27/22* (2013.01)

(58) Field of Classification Search
CPC .................................................. H04L 25/03057
USPC ......................................................... 375/348
See application file for complete search history.

(56) References Cited

U.S. PATENT DOCUMENTS

| 2007/0030926 A1 | 2/2007 | Brown et al. |
| 2009/0154336 A1* | 6/2009 | Green ................. H04L 27/2003 370/210 |

OTHER PUBLICATIONS

Aldo Cero et al., "On Reducted-Complexity Soft-Output Detection of Continuous Phase Modulations," IEEE Vehicular Technology Conference, 2008, pp. 1092-1096, XP031255696.

(Continued)

Primary Examiner — Helene Tayong
(74) Attorney, Agent, or Firm — Baker & Hostetler LLP

(57) ABSTRACT

A method for generating a filter bank for receiving a signal modulated by continuous phase modulation, the modulated signal being able to be broken down as a sum of a plurality of amplitude-modulated signals, each amplitude-modulated signal being expressed by a product between a complex pseudo-symbol and a temporal component with a waveform predefined according to the parameters of the modulation, includes: evaluating, over a duration (T) that is equal to the duration of a symbol, all waveforms of the signal from the parameters of the continuous phase modulation and the breakdown in the form of a sum of a plurality of amplitude-modulated signals, retaining all evaluated waveforms that are different from one another, constructing a filter bank made up of a plurality of filters whose temporal responses are equal to the retained waveforms, which are limited to a duration equal to the duration of a symbol.

8 Claims, 2 Drawing Sheets

(56) References Cited

OTHER PUBLICATIONS

Pierre A. Laurent, "Exact and Approximate Construction of Digital Phase Modulations by Superposition of Amplitude Modulated Pulses (AMP)," IEEE Transactions on Communications, vol. Com-34, No. 2, Feb. 1986, pp. 150-160.

Ghassan Kawas Kaleh, "Simple Coherent Receivers for Partial Response Continuous Phase Modulation," IEEE Journal on Selected Areas in Communications, vol. 7, No. 9, Dec. 1989, pp. 1427-1436.

* cited by examiner

METHOD FOR GENERATING A FILTER BANK FOR RECEIVING A SIGNAL MODULATED BY CONTINUOUS PHASE MODULATION, AND METHOD FOR RECEIVING SAID SIGNAL

CROSS-REFERENCE TO RELATED APPLICATION

This application claims priority to foreign French patent application No. FR 1401953, filed on Sep. 3, 2014, the disclosure of which is incorporated by reference in its entirety.

FIELD OF THE INVENTION

The invention concerns the field of digital radio communication systems and more precisely systems that, in order to form the signal to be transmitted, make use of continuous phase modulation.

BACKGROUND

In a digital communications system, the use of constant amplitude modulations, such as continuous phase modulations, is preferred because these allow the range of the transmitted signal to be maximized. This is because constant-envelope modulations have the benefit of allowing the transmitted signal to have an almost constant power. The phase continuity allows the signal to occupy a smaller bandwidth, and the constant envelope of the signal allows better resistance to the non-linearities of the transmission channel and allows the amplifiers of the system to operate close to their saturation point. A continuous-phase-modulated signal is likewise called a CPM signal.

The advantageous properties of continuous phase modulations appear to a greater extent when the modulation order used is high or when the length of the memory of the modulation is high. However, this results in great implementation complexity for the receiver.

In order to overcome this disadvantage, it is known practice to implement breakdown of the continuous-phase-modulated signal in the form of a sum of amplitude-modulated signals, each component of the form being defined from the parameters of the modulation and weighted by a pseudo-symbol determined from the symbols to be transmitted. The principle of such a breakdown is presented in article [1]. According to the teaching of this document, it is known practice to use the structure of the receiver described in FIG. 1 in order to demodulate a continuous-phase-modulated signal.

Such a receiver 100 has a filter bank 101, 102, ... 10D for filtering the received signal $S_R$. The filters of the bank are each defined by a temporal response $C_0(-t) \ldots C_{D-1}(-t)$ that is suited to the breakdown in the form of amplitude-modulated components according to [1]. The receiver 100 likewise has samplers 111, 112, ... 11D for sampling the filtered signals and a demodulator 120 that executes an algorithm based on a trellis, for example a Viterbi algorithm or a BCJR (Bahl, Cocke, Jelinek and Raviv) algorithm or any other algorithm of the same type. The demodulator 120 determines the most likely transmitted symbol from the filtered symbols. The states and the metrics used by the trellis are developed in document [2].

The receiver 100 described in FIG. 1 has several disadvantages, however.

Firstly, the components of the breakdown of the signal as a sum of amplitude-modulated signals are not orthogonal with respect to one another. Thus, the filters 101, 102, ... 10D that are suited to these components are not orthogonal either, which gives rise to intercomponent interference on the demodulated signal $S_D$.

Secondly, the aforementioned components have a duration that can extend beyond the duration of a symbol to be transmitted. Thus, over each symbol period, the contributions of a plurality of symbols can interfere, the filters of the receiver 100 therefore introducing intersymbol interference.

Thirdly, the samples of the noise at the output of the filters 101, 102, ... 10D whose duration is greater than the duration of a symbol are correlated. The noise at the output of the filter bank therefore cannot be considered to be white Gaussian noise. Branch metrics of the trellis that are used in the Viterbi algorithm or in the BCJR algorithm are then no longer exact, since these are constructed on the strict assumption of additive white Gaussian noise.

The known solutions allowing the three aforementioned disadvantages to be resolved consist most often either in disregarding the effects thereof or in introducing signal equalization solutions and/or noise whitening filters into the receiver. The addition of these solutions considerably increases the complexity of implementation of the receiver.

SUMMARY OF THE INVENTION

The invention proposes a novel receiver structure for demodulating a continuous phase-modulated signal that allows the disadvantages of the receiver described in document [2] to be resolved. In particular, the invention allows the removal of intersymbol interference on reception of a CPM signal.

The aim of the invention is to allow the reception of signals that have been transmitted in the form of a sum of amplitude-modulated signals as described in [1].

The subject matter of the invention is a method for generating a filter bank for receiving a signal modulated by continuous phase modulation, said modulated signal being able to be broken down in the form of a sum of a plurality of amplitude-modulated signals, each amplitude-modulated signal being able to be expressed in the form of the product between a complex pseudo-symbol and a temporal component with a waveform predefined according to the parameters of the modulation, said method comprising the following steps:

evaluating, over a duration T that is equal to the duration of a symbol, all possible waveforms of the signal from the parameters of the continuous phase modulation and the breakdown in the form of a sum of a plurality of amplitude-modulated signals, the evaluation consisting at least in determining all possible values of the complex pseudo-symbols, retaining all evaluated waveforms that are different from one another, constructing a filter bank that is made up of a plurality of filters whose temporal responses are equal to the retained waveforms, which are limited to a duration equal to the duration of a symbol.

According to a particular aspect of the invention, the possible waveforms of the signal are evaluated using a representation of the states of the signal in the form of a trellis, by computing, over all the transitions of any section of the trellis, the value of said complex pseudo-symbols for all of the temporal components considered, a state of the trellis associated with an instant in time of index n being defined by the L information symbols of the signal to be transmitted that are prior to the instant n and the $n-L$-th pseudo-symbol associated with the first temporal component, L being the length of the memory of the continuous phase modulation.

According to a particular aspect of the invention, the method according to the invention comprises, for each transition of any section of the trellis, the evaluation of the computed signal from the temporal components of its breakdown and the computed values of said complex pseudo-symbols.

According to a particular aspect of the invention, the possible waveforms of the signal are evaluated for a reduced number of components in the breakdown of the signal in the form of a sum of a plurality of amplitude-modulated signals.

The subject matter of the invention is likewise a method for receiving a signal modulated by continuous phase modulation, comprising the following steps:

filtering the signal using a filter bank determined by performing the method for generating a filter bank according to the invention, sampling the outputs of the filter bank, demodulating the sampled symbols by performing an algorithm based on a trellis, of Viterbi algorithm or BCJR algorithm type.

The subject matter of the invention is likewise a receiver for receiving a signal modulated by continuous phase modulation, comprising:

a filter bank determined by performing the method for generating a filter bank according to the invention, a means for sampling the outputs of the filter bank, a demodulator that is configured to perform, on the sampled symbols, an algorithm based on a trellis, of Viterbi algorithm or BCJR algorithm type.

The subject matter of the invention is likewise a computer program having instructions for executing the method for generating a filter bank according to the invention when the program is executed by a processor, and a recording medium that can be read by a processor, on which is recorded a program having instructions for executing the method for generating a filter bank according to the invention when the program is executed by a processor.

BRIEF DESCRIPTION OF THE DRAWINGS

Other features and advantages of the present invention will become more apparent on reading the description that follows with reference to the appended drawings, in which.

DETAILED DESCRIPTION

Figure 1:
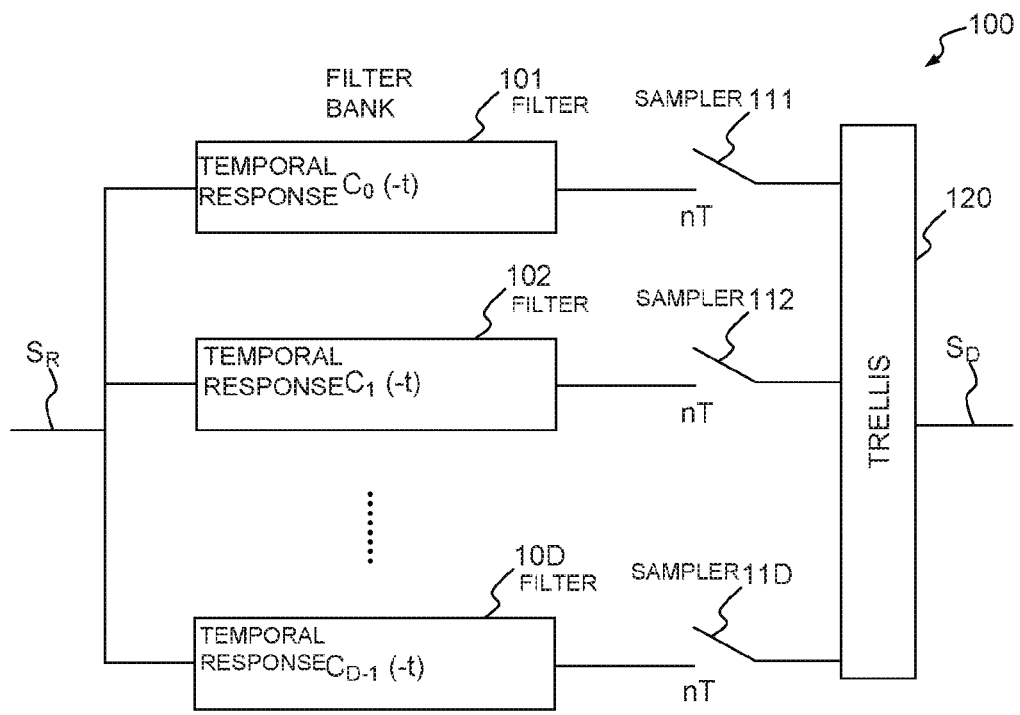
FIG. 1 shows an overview of a receiver of continuous-phase-modulated signals according to the prior art.

As a preface of the description of the invention, a reminder of continuous phase modulations will first of all be introduced.

Continuous phase modulations, referred to as CPM modulations, are a family of modulations that is currently used to transmit digital data, notably within the context of wireless communications. Unlike other modulation methods, for which the phase of the modulated signal is subject to abrupt transitions, CPM modulations allow the phase of the transmitted symbols to be modulated continuously.

A signal modulated by continuous phase modulation is written in the following form:

$$s(t, \underline{\alpha}) = \sqrt{\frac{2E_s}{T}} \cos(2\pi f_0 t + \theta(t, \underline{\alpha}) + \theta_0) = Re[s_b(t, \underline{\alpha})\exp(j2\pi f_0 t)] \quad (1)$$

where:

$$\theta(t, \underline{\alpha}) = \pi h \sum_{i=0}^{N-1} \alpha_i q(t - iT)$$

and $$q(t) = \begin{cases} \int_0^t g(\tau)d\tau, & t < L \\ 1/2, & t \geq L \end{cases}$$

$E_s$ is the average energy of a symbol, T is the time duration of a symbol, $f_0$ is the carrier frequency of the signal, $\theta_0$ is the phase at the origin, $\theta(t,\underline{\alpha})$ is the phase of the signal that modulates the information symbols $\alpha_i$, g(t) is a shaping function that may, by way of example, be a Dirac impulse or a rectangular window, h=k/p is the modulation index and L is the length of the memory of the modulation. In practice, the form of the function q(t) is of rectangular type, as a raised or Gaussian cosine, and the memory L influences the smoothness of the signal.

The information symbols to be transmitted $\alpha_i$ are binary symbols that can take two states.

The signal $s_b(t, \underline{\alpha})$ is the baseband signal. According to the teaching of document [1], this signal can be represented in the form of a sum of amplitude-modulated signals. Each amplitude-modulated signal is equal to the product of a waveform component and a pseudo-symbol constructed from all of the symbols transmitted at the previous instants. The following relations show the representation of the signal $s_b(t)$ as a function of the pseudo-symbols $a_{k,n}$ and the components $c_k(t)$:

$$s_b(t) = \sqrt{2E_s/T} \sum_{k=0}^{D-1} \sum_{n=0}^{N-1} a_{k,n} c_k(t - nT) \quad (2)$$

$$a_{k,n} = \exp(j\pi h A_{k,n})$$

$$A_{k,n} = \sum_{i=0}^{n} \alpha_i - \sum_{j=1}^{L-1} \alpha_{n-j} \beta_{k,j} \quad (3)$$

$$c_k(t) = s_0(t) \sum_{j=1}^{L-1} s_{j+L\beta_{k,j}}(t), \quad 0 < k < K - 1 \quad (4)$$

$$s_j(t) = \frac{\sin(\psi(t + jT))}{\sin(\pi h)}$$

$$\psi(t) = \begin{cases} 2\pi h q(t), & 0 < t < LT \\ \pi h - 2\pi h q(t - LT), & LT < t < 2LT \\ 0, & t > 2LT \end{cases} \quad (5)$$

In the case of binary information symbols to be transmitted $\alpha_i$, the number D of components $c_k(t)$ is no more than equal to $D=2^{L-1}$. The parameter $\beta_{k,j}$ is the j-th bit in the binary breakdown with the index k.

As indicated above and in FIG. 1, a usual manner of demodulating a continuous-phase-modulated signal consists in filtering the received signal using a bank of filters that each have a component $c_k(t)$ of the breakdown of the signal $s_b(t)$ into amplitude-modulated signals as a temporal response. However, this solution has the disadvantages discussed previously.

To overcome these disadvantages, the invention consists in replacing, in the filter bank of the receiver 100, the temporal responses of the filters with new responses that correspond to the waveforms that can be taken by the signal $s_b(t)$ over a symbol period.

The reason is that it is possible to show that, during any symbol period, the modulated signal $s_b(t)$ takes only a finite number $K=p \cdot 2^L$ of highly structured waveforms. This phenomenon is illustrated in FIG. 2, which shows, over a symbol period between the instants nT and (n+1)T, all the possible forms of the modulated signal $s_b(t)$ on the basis of continuous phase modulation with modulation index h=¾, with a shaping function q(t) equal to the raised cosine function and with memory L=2.

Figure 2:
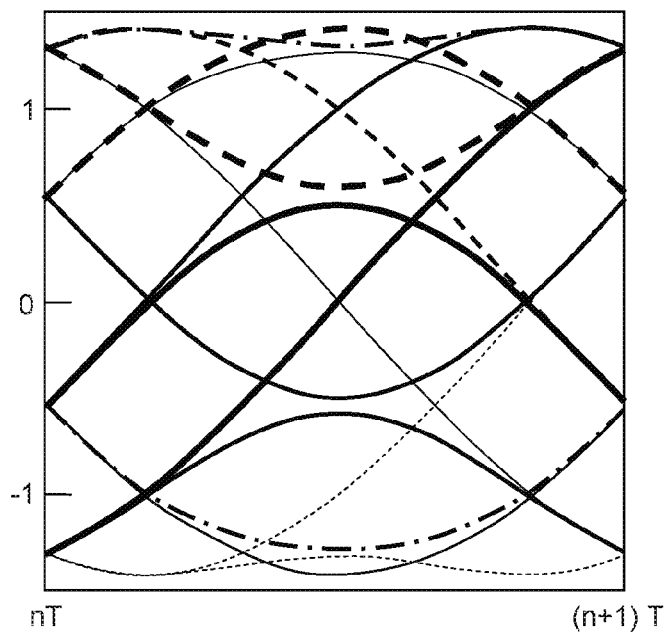
FIG. 2 shows a graph showing the temporal responses of the filters generated according to the invention for an example of continuous phase modulation with index h=¾.

As shown by FIG. 2, the number of waveforms that the signal can take over a duration T is limited to $p \cdot 2^L = 16$ possible waveforms. In other words, whatever the symbols $\alpha_i$ transmitted and whatever the combination thereof, the modulated signal $s_b(t)$ will still take the same theoretical form, among the 16 possible forms, over each symbol duration.

On the basis of this finding, the invention then consists in modifying the receiver 100 from FIG. 1 by using reception filters having responses $\omega_k(t)$, $0 \le k \le K-1$, that are equal to the K possible waveforms of the modulated signal over any symbol period T.

Figure 3:
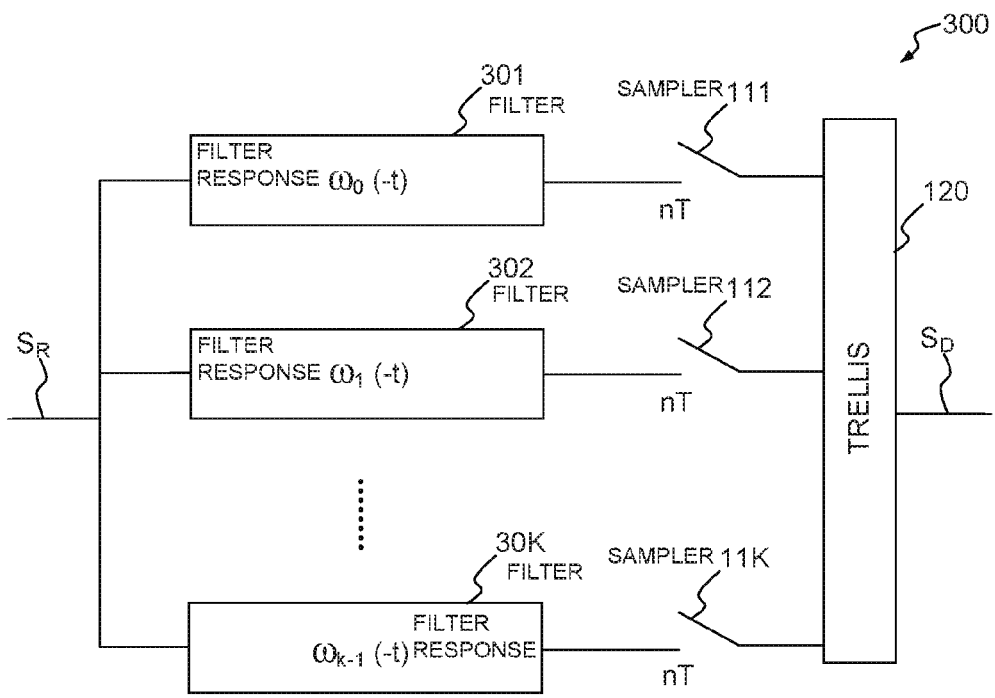
FIG. 3 shows an overview of a receiver of continuous-phase-modulated signals according to the invention.

The samples 111, ..., 11K and the demodulator 120 that are used in the known receiver described in FIG. 1 remain unchanged in the receiver 300 according to the invention, as is illustrated in FIG. 3.

The responses $\omega_k(t)$ of the filters 301, 302, ... 30K of the receiver according to the invention can be determined in several ways.

A first solution consists in determining all the forms that the signal $s_b(t)$ can take by using relations (2) to (4) above, allowing the components $c_k(t)$ and the pseudo-symbols $a_{k,n}$ to be determined, and by varying the values of the information symbols $\alpha_i$ among all the possible values.

This first solution has the disadvantage of being costly in terms of the number of operations to be executed.

A second solution consists in evaluating all the representations of the signal $s_b(t)$ over a symbol duration by using an algorithm based on a representation of the signal in trellis form, the trellis used being identical to that implemented by a decoding algorithm of Viterbi or BCJR type that is executed by the demodulator 120 of the receiver.

Document [2] describes the use of such an algorithm in order to perform the demodulation 120 of the sampled signals at the output of the filter bank within the context of a receiver 100 that is described in FIG. 1.

Figure 4:
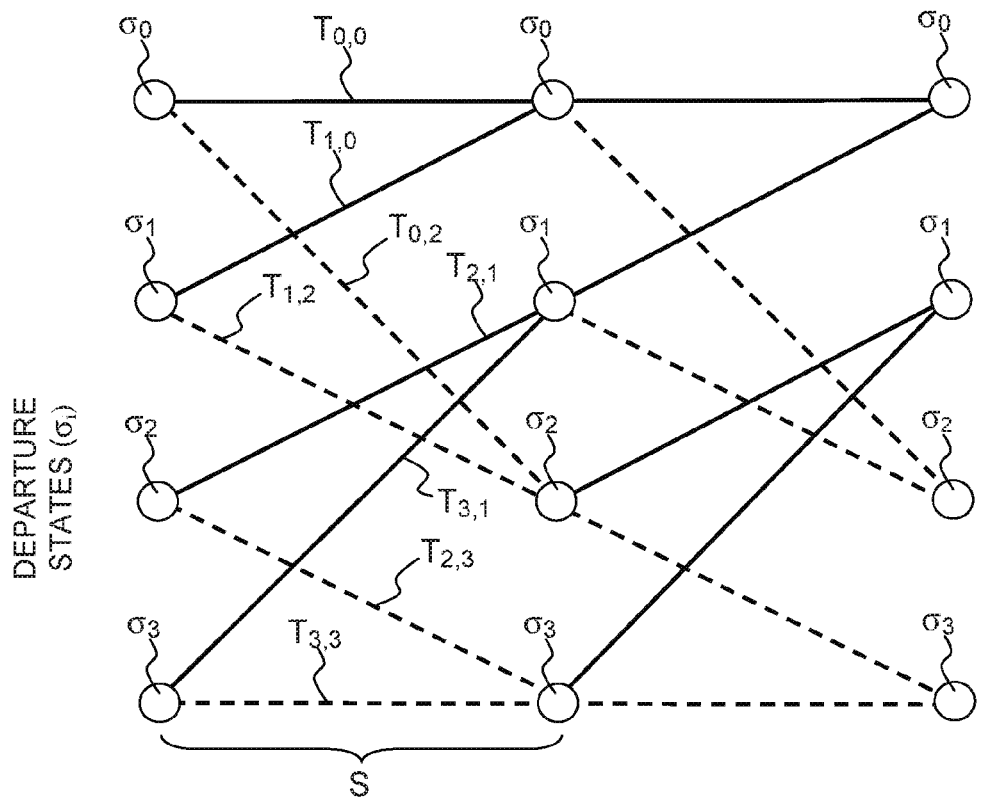
FIG. 4 shows a representational example of a trellis used to evaluate the possible representations of the signal.

A non-limiting four-state trellis example is shown in FIG. 4. Any section S of the trellis is defined by a set of departure states $\{\sigma_0, \sigma_1, \sigma_2, \sigma_3\}$ and arrival states, which are identical.

The number of states on a section of the trellis is equal to $p \cdot 2^{L-1}$, where p is the numerator of the modulation index h=k/p. The states associated with two consecutive instants n, n−1 are connected to one another by branches representing transitions $T_{0,0}, \ldots T_{3,3}$ from one state to another.

According to the teaching of document [2], a state $\sigma_i$ of the trellis is defined by the vector $\{a_{0,n-L}, \alpha_{n-L+1}, \ldots, \alpha_{n-2}, \alpha_{n-1}\}$ where $\alpha_{n-L+1}, \ldots, \alpha_{n-2}, \alpha_{n-1}$ are the L−1 last symbols prior to the instant n under consideration and $a_{0,n-L}$ is the pseudo-symbol at the instant n−L associated with the component k=0 of the breakdown into amplitude-modulated signals according to relation (2).

The pseudo-symbol $a_{0,n-L}$ is dependent on the n−L symbols $\alpha_i$ received previously:

$$a_{0,n-L} = \exp\left(j\pi h \sum_{i=0}^{n-L} \alpha_i\right) \quad (6)$$

Each section of the trellis likewise has an associated new symbol to be transmitted $\alpha_n$.

From an input state $\sigma_0$, an output state $\sigma_2$ (which corresponds to the situation of the signal at the next instant n+1) is attained by following a transition $T_{0,2}$.

For each state of the trellis, in other words for each combination of values that the vector $\{a_{0,n-L}, \alpha_{n-L+1}, \ldots, \alpha_{n-2}, \alpha_{n-1}\}$ can take according to the symbols to be transmitted $\alpha_{n-L+1}, \ldots, \alpha_{n-2}, \alpha_{n-1}$, it is possible to compute the other pseudo-symbols, which are associated with the breakdown according to relation (2) for the strictly positive indices k, by means of the following recurrence relations:

$$A_{k,n} = A_{0,n-L} + \alpha_n + \sum_{i=1}^{L-1} (1-\beta_{k,i})\alpha_{n-i} \quad (7)$$

$$A_{k,n-l} = A_{0,n-L} + \alpha_{n-l} + \sum_{i=l+1}^{L-1} (1-\beta_{k,i})\alpha_{n-i}$$

The values of the pseudo-symbols $a_{0,n-L}, \ldots a_{K,n-L}$ are then determined on a transition from any section S of the trellis.

On the basis of the evaluation of the possible states that the pseudo-symbols can take and of relations (4) and (5), which define the form of the components $c_k(t)$, a possible representation of the CPM signal is then obtained.

$$s_b(t) = \sqrt{2E_s/T} \sum_{k=0}^{D-1} \sum_{l=n-L}^{n} a_{k,j} c_k(t-lT) \quad (8)$$

Secondly, the method is repeated on all the transitions of the chosen section S of the trellis in order to obtain all the possible representations of the signal $s_b(t)$ that is represented by relation (8).

Computation of the pseudo-symbols $a_{0,n-L}, \ldots a_{K,n-L}$ on all the transitions of any section of the trellis makes it possible to obtain all the possible representations of the signal over a symbol duration.

Only the representations that are different from one another are preserved.

The temporal responses $\omega_i(t)$ of the filters 301, ..., 30K of the filter bank according to the invention are determined by limiting the representations of the signal that are obtained at the end of the evaluation using the trellis over a symbol duration T $$\omega_i(t) = s_b(t) \cdot \Pi_T(t+T/2)$$

$\Pi_T( )$ is the gate function over a duration T.

Without departing from the scope of the invention, a person skilled in the art will be able to use trellis-based algorithms that are equivalent to those described above and that similarly allow evaluation of all the possible representations of the signal broken down into sums of amplitude-modulated signals.

A variant embodiment of the invention consists in limiting the number of filters in the bank of reception filters in order to reduce the complexity of implementation of the receiver. This is because, as shown in document [1], the first components $C_0(t), C_1(t) \ldots$ of the breakdown into amplitude-modulated signals concentrate a large portion of the energy of the signal, while the components $C_k(t)$ for the high indices k have only little energy.

For this reason, when the possible waveforms that the signal $s_b(t)$ can take are evaluated, it is possible to limit the breakdown to a reduced number of components, for example two components only. By limiting the number of components, the number of identical representations of the signal increases and therefore the number of filters obtained at the end of the method decreases.

The method according to the invention that allows determination of the temporal responses of the filters $301, \ldots, 30K$ can be implemented as a computer program having instructions for its execution. The computer program can be recorded on a recording medium that is able to be read by a processor.

The receiver 300 according to the invention can comprise hardware and/or software elements for implementing the filters $301, \ldots 30K$, the samplers $111, 112 \ldots 11K$ and the demodulator 120. It can notably comprise a processor and a memory. The processor may be a generic processor, a specific processor, an application-specific integrated circuit (also known by the name ASIC) or a field-programmable gate array (also known by the name FPGA).

The invention notably has the following advantages. As the filters used at reception are without a memory, the noise at the output of the filters is white Gaussian noise. Thus, it is no longer necessary to add an additional whitening filter to the receiver and the demodulation algorithm of Viterbi or BCJR type can be implemented without approximations, since the metrics used assume white Gaussian noise.

Moreover, intersymbol interference and intercomponent interference is substantially reduced owing to the use of reception filters that are suited to the various waveforms that the signal can take over a symbol period. Notably, intersymbol interference is eliminated because the filters used have a time-based medium limited to one symbol period.

REFERENCES

[1] P Laurent, "Exact and approximate construction of digital phase modulations by superposition of amplitude-modulated pulses (amp)," IEEE Transactions on Communications, vol. 34, no. 2, pp. 150-160, 1986.
[2] Ghassan Kawas Kaleh, "Simple coherent receivers for partial response continuous phase modulation," IEEE Journal on Selected Areas in Communications, vol. 7, no. 9, pp. 1427-1436, 1989.

The invention claimed is:

1. A method for receiving a signal that is transmitted after being modulated by a continuous phase modulation, said modulated signal being able to be broken down in a form of a sum of a plurality of amplitude-modulated signals, each amplitude-modulated signal being able to be expressed in a form of a product between a complex pseudo-symbol and a temporal component with a waveform predefined according to parameters of the continuous phase modulation, said method comprising a step of:
   implementing, at a receiver, a filter bank, the filter bank being generated with the steps of:
   evaluating, over a duration (T) that is equal to a duration of a symbol, all waveforms of the modulated signal from the parameters of the continuous phase modulation and a breakdown in the form of the sum of the plurality of amplitude-modulated signals, the evaluating including at least determining all values of the complex pseudo-symbols,
   retaining all the evaluated waveforms that are different from one another, and
   constructing the filter bank made up of a plurality of filters whose temporal responses are equal to the retained waveforms, said retained waveforms being limited to a duration equal to the duration of the symbol; and
   demodulating, at the receiver, the modulated signal upon filtering by the filter bank.

2. The method according to claim 1, wherein the waveforms of the modulated signal are evaluated by a representation of states of the modulated signal in the form of a trellis, by computing, over all transitions of any section of the trellis, the value of said complex pseudo-symbols for all of temporal components considered, a state ($\sigma_j$) of the trellis associated with an instant in time of index n being defined by L information symbols of the signal to be transmitted that are prior to the instant n and the $(n-L)^{th}$ pseudo-symbol associated with a first temporal component, L being a length of a memory associated with the continuous phase modulation.

3. The method according to claim 2, further comprising, for each transition of any section of the trellis, the evaluating of the modulated signal, the evaluating being computed from the temporal components of the breakdown of the modulated signal and the determined values of said complex pseudo-symbols.

4. The method according to claim 1, wherein the waveforms of the modulated signal are evaluated for a reduced number of components in the breakdown of the modulated signal in the form of the sum of the plurality of amplitude-modulated signals.

5. A method for receiving a signal modulated by a continuous phase modulation, comprising the following steps:
   filtering the modulated signal by a filter bank determined by performing a method for generating the filter bank for receiving the modulated signal, said modulated signal being able to be broken down in a form of a sum of a plurality of amplitude-modulated signals, each amplitude-modulated signal being able to be expressed in a form of a product between a complex pseudo-symbol and a temporal component with a waveform predefined according to parameters of the continuous phase modulation, said method for generating including:
   evaluating, over a duration (T) that is equal to a duration of a symbol, all waveforms of the modulated signal from the parameters of the continuous phase modulation and a breakdown in the form of the sum of the plurality of amplitude-modulated signals, the evaluating including at least determining all values of the complex pseudo-symbols,
   retaining all evaluated waveforms that are different from one another, constructing the filter bank that is made up of a plurality of filters whose temporal responses are equal to the retained waveforms, said retained waveforms being limited to a duration equal to the duration of the symbol,
   sampling outputs of symbols of the filter bank, and
   demodulating the sampled outputs of the symbols by executing a trellis based algorithm, a Viterbi algorithm or a Bahl-Cocke-Jelinek-Raviv (BCJR) algorithm.

6. A receiver for receiving a signal modulated by a continuous phase modulation, comprising:
   a filter bank determined by performing a method for generating the filter bank for receiving the signal modulated by continuous phase modulation, said modulated signal being able to be broken down in a form of a sum of a plurality of amplitude modulated signals, each amplitude-modulated signal being able to be expressed in a form of a product between a complex pseudo-symbol and a temporal component with a waveform predefined according to parameters of the continuous phase modulation, said method for generating including:

evaluating, over a duration (T) that is equal to a duration of a symbol, all waveforms of the modulated signal from the parameters of the continuous phase modulation and a breakdown in the form of the sum of the plurality of amplitude-modulated signals, the evaluating including at least determining all values of the complex pseudo-symbols, retaining all evaluated waveforms that are different from one another, constructing the filter bank that is made up of a plurality of filters whose temporal responses are equal to the retained waveforms, said retained waveforms being limited to a duration equal to the duration of the symbol, a sampler configured to sample outputs of symbols of the filter bank, and a demodulator configured to execute, on the sampled outputs of the symbols, a trellis based algorithm for a demodulation, a Viterbi algorithm or a Bahl-Cocke-Jelinek-Raviv (BCJR) algorithm.

7. A device storing a computer program product having instructions stored on a tangible non-transitory storage medium for executing, by a processor, a method for receiving a signal that is transmitted after being modulated by a continuous phase modulation, said modulated signal being able to be broken down in a form of a sum of a plurality of amplitude-modulated signals, each amplitude-modulated signal being able to be expressed in a form of a product between a complex pseudo-symbol and a temporal component with a waveform predefined according to parameters of the continuous phase modulation, said method when executed by the processor cause the processor to carry out steps comprising:

evaluating, over a duration (T) that is equal to a duration of a symbol, all waveforms of the modulated signal from the parameters of the continuous phase modulation and a breakdown in the form of the sum of the plurality of amplitude-modulated signals, the evaluating including at least determining all values of the complex pseudo-symbols, retaining all evaluated waveforms that are different from one another, constructing the filter bank that is made up of a plurality of filters whose temporal responses are equal to the retained waveforms, said retained waveforms being limited to a duration equal to the duration of the symbol, and demodulating the modulated signal upon filtering by the filter bank.

8. A tangible non-transitory processor-readable recording medium, on which is recorded a program having processor executable instructions for executing a method for receiving a signal that is transmitted after being modulated by a continuous phase modulation, said modulated signal being able to be broken down in a form of a sum of a plurality of amplitude modulated signals, each amplitude-modulated signal being able to be expressed in a form of a product between a complex pseudo-symbol and a temporal component with a waveform predefined according to parameters of the continuous phase modulation, said method comprising:

evaluating, over a duration (T) that is equal to a duration of a symbol, all waveforms of the modulated signal from the parameters of the continuous phase modulation and a breakdown in the form of the sum of the plurality of amplitude-modulated signals, the evaluating including at least determining all values of the complex pseudo-symbols, retaining all evaluated waveforms that are different from one another, constructing the filter bank that is made up of a plurality of filters whose temporal responses are equal to the retained waveforms, said retained waveforms being limited to a duration equal to the duration of the symbol, and demodulating, at a receiver, the modulated signal upon filtering by the filter bank.

\* \* \* \* \*